United States Patent
Bowen et al.

(10) Patent No.: US 11,830,680 B2
(45) Date of Patent: Nov. 28, 2023

(54) REDUCTION OF CHARGING TIME IN CAPACITORS

(71) Applicant: Pacesetter, Inc., Sylmar, CA (US)

(72) Inventors: David Bowen, Taylors, SC (US); Ralph Jason Hemphill, Sunset, SC (US); Thomas F. Strange, Easley Pickens, SC (US)

(73) Assignee: Pacesetter, Inc., Sylmar, CA (US)

( * ) Notice: Subject to any disclaimer, the term of this patent is extended or adjusted under 35 U.S.C. 154(b) by 231 days.

(21) Appl. No.: 16/840,304

(22) Filed: Apr. 3, 2020

(65) Prior Publication Data

US 2021/0313117 A1    Oct. 7, 2021

(51) Int. Cl.
*H01G 9/00*     (2006.01)
*H01G 9/045*    (2006.01)
*H01G 9/048*    (2006.01)

(52) U.S. Cl.
CPC ........... *H01G 9/0029* (2013.01); *H01G 9/045* (2013.01); *H01G 9/048* (2013.01)

(58) Field of Classification Search
CPC ........ H01G 9/00; H01G 9/0029; H01G 9/045; H01G 9/048
See application file for complete search history.

(56) References Cited

U.S. PATENT DOCUMENTS

| | | | |
|---|---|---|---|
| 2013/0335885 A1* | 12/2013 | Ginatulin | H01G 11/42 29/25.03 |
| 2015/0318540 A1* | 11/2015 | Take | H01M 4/5825 29/623.5 |
| 2015/0340698 A1* | 11/2015 | Take | H01M 10/0525 429/212 |
| 2018/0354069 A1* | 12/2018 | Erickson | B23K 26/38 |

FOREIGN PATENT DOCUMENTS

| | | | | |
|---|---|---|---|---|
| KR | 100935502 | * | 1/2010 | ............... C23G 1/26 |
| WO | WO-2011121984 A1 | * | 10/2011 | ........... H01G 9/0032 |

\* cited by examiner

*Primary Examiner* — Alexander G Ghyka (57) ABSTRACT

Fabricating an electrode for use in a capacitor includes cutting an electrode precursor from a sheet of material. The electrode precursor is exposed to steam so as to form a steamed electrode precursor. A capacitor is fabricated and includes an electrode generated from the steamed electrode precursor.

20 Claims, 8 Drawing Sheets

REDUCTION OF CHARGING TIME IN CAPACITORS

FIELD

The invention relates to electrochemical devices. In particular, the invention relates to electrodes in capacitors.

BACKGROUND

Electrodes used in capacitors are often cut from a sheet of material that has a layer of a metal oxide on a layer of metal. The metal oxide on the sheet of material is in a first phase that is desirable for operation of the capacitor. Laser cutting can be used to cut the electrodes from the sheet of material. Laser cutting can vaporize a portion of the sheet of material. As it cools, the vapor condenses and leaves a residue at the edge of the electrode. The residue has multiple different phases of the metal oxide. Some of the phases are difficult to convert back to the first phase and lead to an increase in the amount of energy required to fully charge the capacitor. As a result, there is a need for improved capacitors and improved methods of capacitor fabrication.

SUMMARY

Fabricating an electrode for use in a capacitor includes cutting an electrode precursor from a sheet of material. The electrode precursor is exposed to steam so as to form a steamed electrode precursor. A capacitor is fabricated and includes an electrode generated from the steamed electrode precursor.

The electrode precursor can include a first phase of an electrode metal oxide on an anode metal and a second phase of the electrode metal oxide on the anode metal. Fabricating the capacitor can include a recovery process that replaces at least a portion of the second phase of the electrode metal oxide with a recovery electrode metal oxide. The recovery electrode metal oxide is a phase of the metal oxide that is different from the second phase of the electrode metal oxide. The recovery electrode metal oxide can be different from the first phase of the electrode metal oxide or can include the first phase of the electrode metal oxide. In some instances, the second phase of the electrode metal oxide is formed on the electrode precursor as a result of cutting the electrode precursor from the sheet of material.

BRIEF DESCRIPTION OF THE FIGURES

FIG. 1A through FIG. 1G illustrate the construction of a capacitor.

FIG. 2A through FIG. 2I illustrate a method of generating an anode for use in a capacitor constructed according to FIG. 1A through FIG. 1G.

DESCRIPTION

An electrode for a capacitor is fabricated by obtaining an electrode precursor having a first phase of a metal oxide on a metal. The first phase of the metal oxide is a desired feature of the electrode precursor; however, the electrode precursor can also include a second phase of the metal oxide that can be a source of deformation and/or leakage in a capacitor fabricated from the electrode precursor. The electrode precursor is exposed to steam so as to form a hydration layer on the electrode precursor.

A recovery process is performed on the steamed electrode precursor. The presence of the preliminary hydration layer during the recovery process causes at least a portion of the second phase of the metal oxide to be removed from the electrode precursor during the recovery process and/or to be replaced with a recovery electrode metal oxide that is more desirable than the second phase of the metal oxide. Additionally or alternately, the recovery process can grow the recovery electrode metal oxide on regions of the anode precursor where the electrode metal is exposed to the hydration layer.

The inventors have found that the exposure of the electrode precursor to the steam can unexpectedly generate the hydration layer in a time period that is less than 12.5% of the time required to form a hydration layer by exposing the electrode precursor to a water bath. Additionally, the recovery process can serve as or replace the aging process that is often used in the fabrication of capacitors. The inventors have found that the duration of the recovery process can be at least 14% lower than the aging process used when the hydration layer is not formed. As a result, exposure of the electrode precursor to the steam can reduce the fabrication time of the capacitor.

The overall deformation of a capacitor that includes electrodes fabricated from the electrode precursor can be reduced by at least 35% relative to the same capacitor fabrication process without formation of the hydration layer. The reduced deformation corresponds to a reduced charging time. Capacitors with reduced charge times require less energy from the power source used to charge the capacitor. As a result, the reduction in charging time can increase the life of devices that use a battery to charge the capacitor. Examples of these devices include medical devices such as Implantable Cardioverter Defibrillators (ICDs). As a result, the reduced deformation can lead to improvements in the lifetime of implanted medical devices.

Figures 1A, 1B:
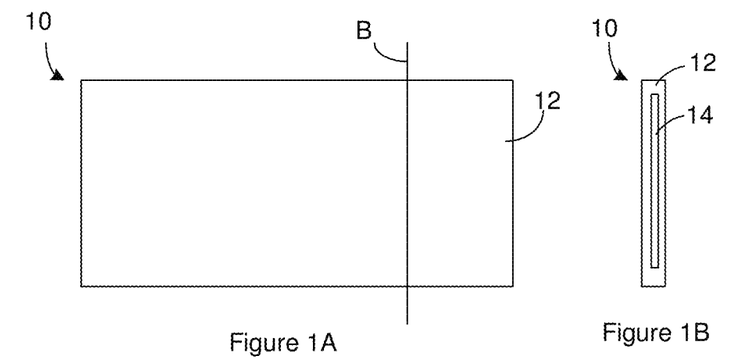
FIG. 1A is a sideview of an anode that is suitable for use in the capacitor.
FIG. 1B is a cross-section of the anode shown in FIG. 1A taken along the line labeled B in FIG. 1A.

FIG. 1A through FIG. 1G illustrate the construction of a capacitor. FIG. 1A is a sideview of an anode 10 that is suitable for use in the capacitor. FIG. 1B is a cross-section of the anode 10 shown in FIG. 1A taken along the line labeled B in FIG. 1A. The anode 10 includes, consists of, or consists essentially of a layer of anode metal oxide 12 over a layer of an anode metal 14. Suitable anode metals 14 include, but are not limited to, aluminum, tantalum, magnesium, titanium, niobium, and zirconium. As illustrated in FIG. 1B, in some instances, the anode metal oxide 12 surrounds the anode metal 14 in that the anode metal oxide 12 is positioned on both the edges and the faces of the anode metal 14. Many anode metal oxides 12 can exist in more than one phase within the same material state (solid, liquid, gas, plasma). For instance, an anode metal oxide 12 such as aluminum oxide can be in a boehmite phase (AlO(OH)) that is a solid or in alpha phase corundum oxide ($\alpha$-$Al_2O_3$) that is also a solid.

Figures 1C, 1D:
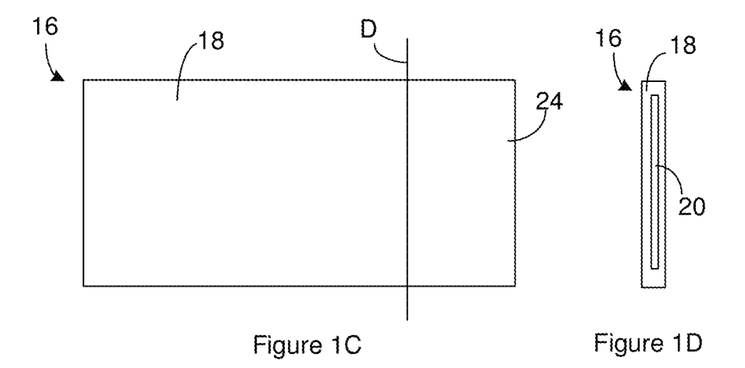
FIG. 1C is a sideview of a cathode that is suitable for use in the capacitor.
FIG. 1D is a cross-section of the cathode shown in FIG. 1C taken along the line labeled D in FIG. 1C.

FIG. 1C is a sideview of a cathode 16 that is suitable for use in the capacitor. FIG. 1D is a cross-section of the cathode 16 shown in FIG. 1C taken along the line labeled D in FIG. 1C. The cathode 16 includes a layer of cathode metal oxide 18 over a layer of a cathode metal 20. Suitable cathode metals 20 include, but are not limited to, aluminum, titanium, and stainless steel. Although not illustrated, the cathode metal can be layer of material on a substrate. For instance, the cathode metal can be a titanium or titanium nitride coating on a substrate such as a metal and/or electrically conducting substrate. Examples of suitable substrates include, but are not limited to, aluminum, titanium, and stainless steel substrates. The cathode metal oxide 18 can be formed on the cathode metal 20 by oxidizing the cathode metal 20 in air. The cathode metal 20 can be the same as the anode metal 14 or different from the anode metal 14. In some instances, the cathode metal 20 and the anode metal 14 are both aluminum. As illustrated in FIG. 1D, in some instances, the cathode metal oxide 18 surrounds the cathode metal 20. For instance, the cathode metal oxide 18 is positioned over the edges and faces of the cathode metal 20.

Figure 1E:
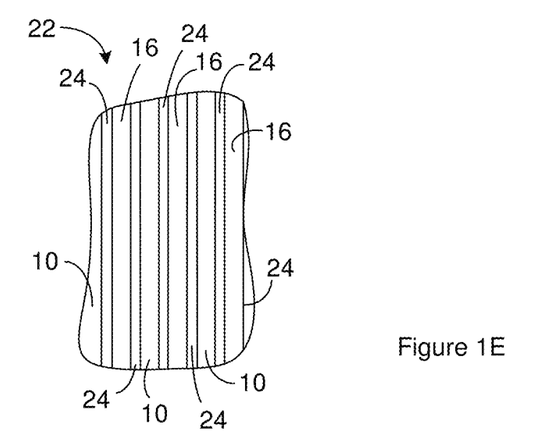
FIG. 1E is a cross section of an electrode assembly where anodes are alternated with cathodes. The anodes and cathodes can be constructed according to FIG. 1A through FIG. 1D.

The anodes 10 and cathodes 16 are generally arranged in an electrode assembly 22 where one or more anodes 10 are alternated with one or more cathodes 16. For instance, FIG. 1E is a cross section of an electrode assembly 22 where anodes 10 are alternated with cathodes 16. The anodes 10 and cathodes 16 can be constructed according to FIG. 1A through FIG. 1D. A separator 24 is positioned between anodes 10 and cathodes 16 that are adjacent to one another in the electrode assembly 22. The electrode assembly 22 typically includes the anodes 10 and cathodes 16 arranged in a stack or in a jelly roll configuration. Accordingly, the cross section of FIG. 1E can be a cross section of an electrode assembly 22 having multiple anodes 10 and multiple cathodes 16 arranged in a stack. Alternately, the cross section of FIG. 1E can be created by winding one or more anodes 10 together with one or more cathodes 16 in a jelly roll configuration. However, as the anodes become more brittle due to increased surface area, it may not be practical or possible to form a jelly-roll configuration. Suitable separators 24 include, but are not limited to, kraft paper, fabric gauze, and woven for non-woven textiles made of one or a composite of several classes of nonconductive fibers such as aramids, polyolefins, polyamides, polytetrafluoroethylenes, polypropylenes, and glasses.

Figure 1F:
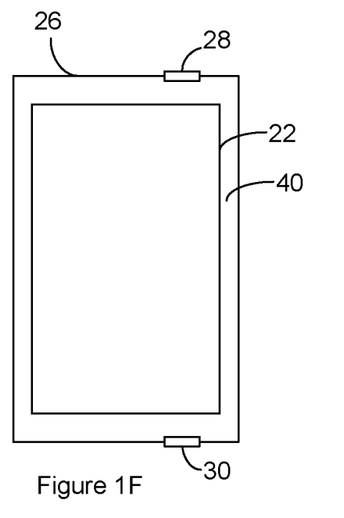
FIG. 1F is a schematic diagram of a capacitor that includes the electrode assembly of FIG. 1E positioned in a capacitor case.

The electrode assembly 22 is included in a capacitor. For instance, FIG. 1F is a schematic diagram of a capacitor that includes the electrode assembly 22 of FIG. 1E positioned in a capacitor case 26. Although not illustrated, the one or more anodes in the electrode assembly 22 are in electrical communication with a first terminal 28 that can be accessed from outside of the capacitor case 26. The one or more cathodes 16 in the electrical assembly are in electrical communication with a second terminal 30 that can be accessed from outside of the capacitor case 26. In some instances, the one or more anodes include or are connected to tabs (not shown) that provide electrical communication between the one or more anodes and the first terminal 28 and the one or more cathodes 16 include or are connected to tabs (not shown) that provide electrical communication between the one or more cathodes 16 and the second terminal 30. The capacitor can include one or more electrical insulators (not shown) positioned as needed to prevent shorts-circuits within the capacitor.

Figure 1G:
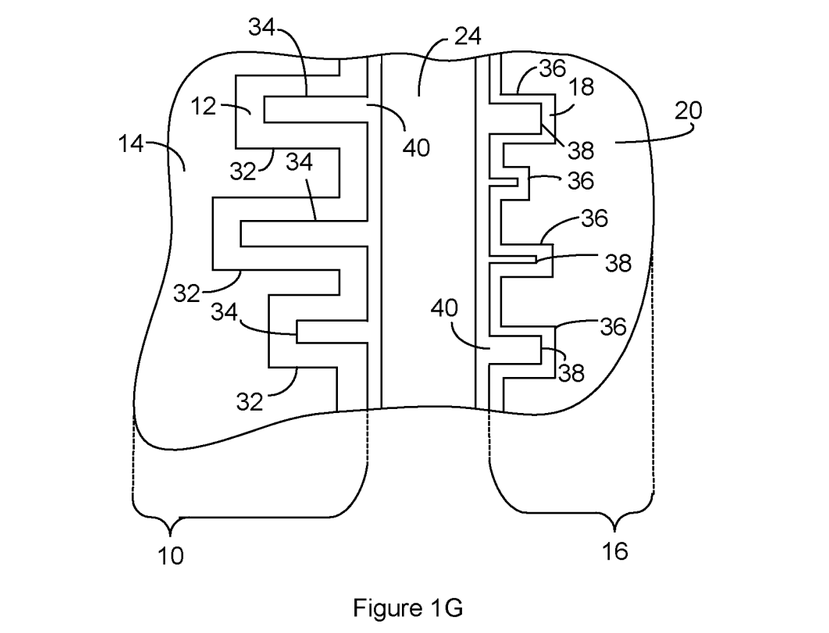
FIG. 1G is a sideview of an interface between an anode and a cathode that are adjacent to one another in the capacitor of FIG. 1F.

FIG. 1G is a sideview of an interface between an anode 10 and a cathode 16 that are adjacent to one another in the capacitor of FIG. 1F. The illustration in FIG. 1G is magnified so it shows features of the anode 10 and cathode 16 that are not shown in FIG. 1A through FIG. 1E. The face of the anode 10 includes channels 32 that extend into the anode metal 14 so as to increase the surface area of the anode metal 14. Although the channels 32 are shown extending part way into the anode metal, all or a portion of the channels 32 can extend through the anode metal. Suitable channels 32 include, but are not limited to, pores, trenches, tunnels, recesses, and openings. In some instances, the channels 32 are configured such that the anode has a number of channels/area greater than or equal to 30 million tunnels/$cm^2$. Increasing the number of channels has been shown to increase the brittleness of the anodes and/the sheet of material from which the anodes are extracted. Accordingly, increasing the surface area of the anode can result in a more brittle anode or sheet of material. The anode metal oxide 12 is positioned on the surface of the anode metal 14 and is positioned in the channels 32. The anode metal oxide 12 can fill the channels 32 and/or anode oxide channels 34 can extend into the anode metal oxide 12. However, it is generally not desirable for the anode metal oxide 12 to fill the channels 32 because filling the channels 32 can lead to reduced capacitance and electrical porosity.

The surface of the cathode 16 optionally includes cathode channels 36 that extend into the anode metal 14 so as to increase the surface area of the anode metal 14. Suitable cathode channels 36 include, but are not limited to, pores, trenches, tunnels, recesses, and openings. The cathode metal oxide 18 can be positioned on the surface of the cathode metal 20. When the cathode metal 20 includes cathode channels 36, the cathode metal oxide 18 can be positioned in the cathode channels 36. The cathode metal oxide 18 can fill the cathode channels 36 and/or cathode oxide channels 38 can extend into the cathode metal oxide 18.

An electrolyte 40 is in contact with the separator 24, the anode 10 and the cathode 16. The electrolyte 40 can be positioned in the cathode oxide channels 38. When the cathode metal 20 includes cathode oxide channels 38, the electrolyte 40 can be positioned in the cathode oxide channels 38. The electrolyte 40 can be a liquid, solid, gel or other medium and can be absorbed in the separator 24. The electrolyte 40 can include one or more salts dissolved in one or more solvents. For instance, the electrolyte 40 can be a mixture of a weak acid and a salt of a weak acid, preferably a salt of the weak acid employed, in a polyhydroxy alcohol solvent. The electrolytic or ion-producing component of the electrolyte 40 is the salt that is dissolved in the solvent.

A capacitor constructed according to FIG. 1A through FIG. 1G can be an electrolytic capacitor such as an aluminum electrolytic capacitor, a tantalum electrolytic capacitor or a niobium electrolytic capacitor. An electrolytic capacitor is generally a polarized capacitor where the anode metal oxide 12 serves as the dielectric and the electrolyte 40 effectively operates as the cathode 16.

Figures 2A, 2B:
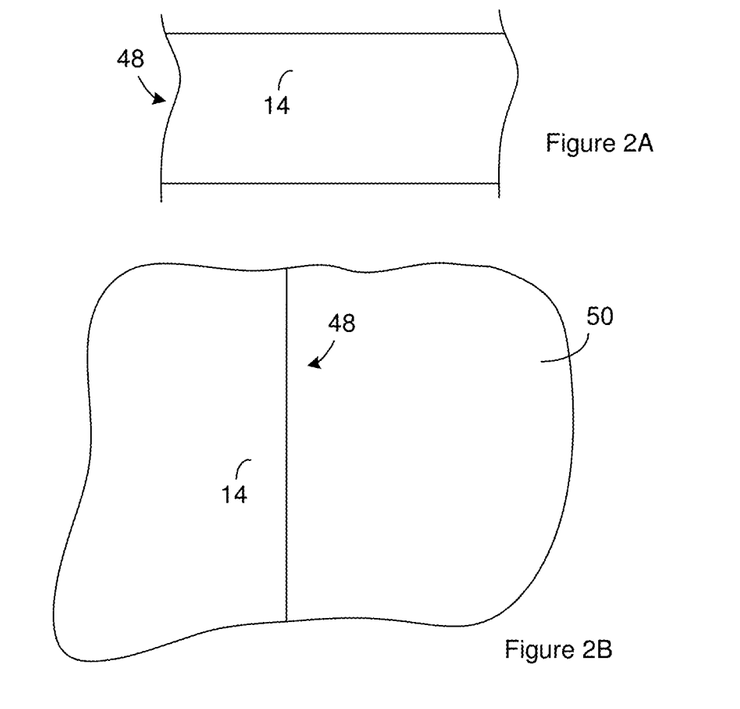
FIG. 2A is a topview of a sheet of material from which the anode is constructed. The sheet of material can be a sheet of an anode metal.
FIG. 2B is a portion of a cross section of the sheet of material showing an interface between the side of the sheet of material and the atmosphere in which the sheet of material is positioned.

FIG. 2A through FIG. 2I illustrate a method of generating an anode for use in a capacitor constructed according to FIG. 1A through FIG. 1G. A sheet of material 48 can be acquired either by fabrication or purchase from a supplier. As will be evident below, one or more anodes are constructed from the sheet of material 48. FIG. 2A is a topview of the sheet and shows a face of the sheet positioned between edges. FIG. 2B is a portion of a cross section of the sheet showing an interface between the face of the sheet of material 48 and the atmosphere 50 in which the sheet is positioned. The sheet of material 48 can include, consist of, or consist essentially of the anode metal 14.

A surface area enhancement phase can be performed so as to increase the surface area of the sheet of material 48. For instance, preliminary channels 52 can be formed in the sheet of material 48 so as to provide the sheet of material 48 with the cross section of FIG. 2C. Suitable methods of forming the preliminary channels 52 include, but are not limited to, laser removal and/or drilling, etching such as chemical etching and electrochemical etching. In one example, the etching is electrochemical etching or electrochemical drilling. In electrochemical etching and/or electrochemical drilling, the sheet of material 48 is at least partially immersed in a bath that includes, consists of, or consists essentially of an electrochemical drilling (ECD) solution initially having a pH of less than 5 while passing an electrical current through the sheet of material 48. Additional examples of suitable methods for forming the preliminary channels 52 and/or additional details of suitable methods of electrochemical etching and/or electrochemical drilling can be found in U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser. No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

In some instances, the surface area enhancement phase also includes widening of the preliminary channels 52. Widening of the preliminary channels can reduce or stop the anode metal oxide 12 from filling the channels 32. For instance, the distance across the preliminary channels 52 on the sheet of FIG. 2C can be increased to provide a sheet of material 48 having the channels 32 shown in the cross section of FIG. 2D. In some instances, the preliminary channels 52 are formed and widened so as to remove more than 52% or 60% of the sheet of material 48 from the sheet of material 48 and/or to create more than 30 million channels/cm$^2$ of the sheet of material 48.

Figure 2C:
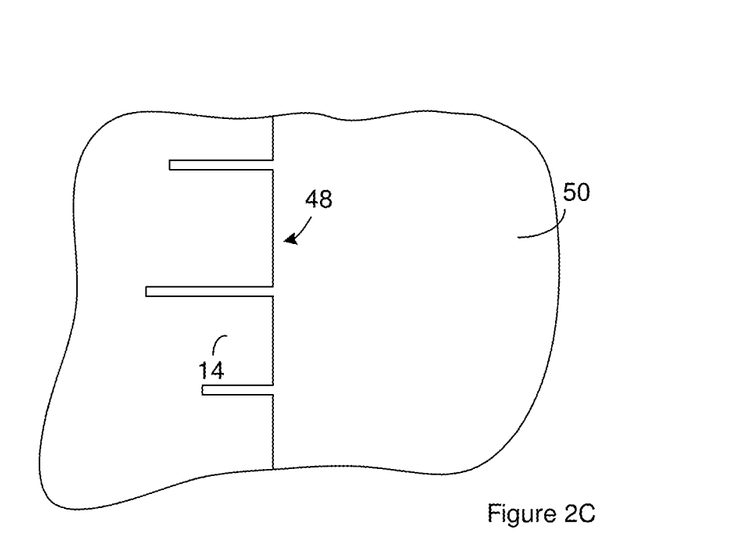
FIG. 2C illustrates the sheet of material of FIG. 2B after the formation of preliminary channels in the sheet of material.
Figure 2D:
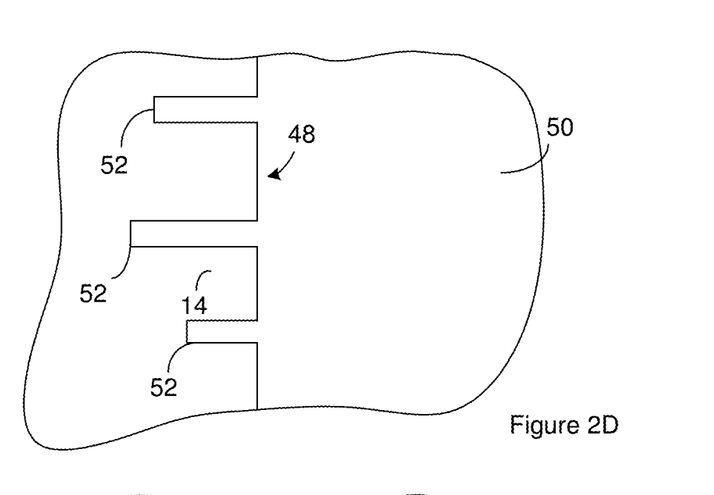
FIG. 2D illustrates the sheet of material of FIG. 2C after widening the preliminary channels.

Suitable methods for widening the preliminary channels 52 include, but are not limited to, chemical and electrochemical processes. In one example of the widening process, widening of the preliminary channels 52 includes immersing at least a portion of the sheet of material 48 in an electrolyte solution that includes, consists of, or consists essentially of a chloride or nitrate. Additional examples of suitable methods for widening of the preliminary channels 52 and/or additional details about the above methods of widening preliminary channels 52 can be found in U.S. patent application Ser. No. 05/227,951, filed on Feb. 22, 1972, granted U.S. Pat. No. 3,779,877, and entitled "Electrolytic Etching of Aluminum Foil;" U.S. patent application Ser. No. 06/631, 667, filed on Jul. 16, 1984, granted U.S. Pat. No. 4,525,249, and entitled "Two Step Electro Chemical and Chemical Etch Process for High Volt Aluminum Anode Foil;" U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser. No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

Figure 2E:
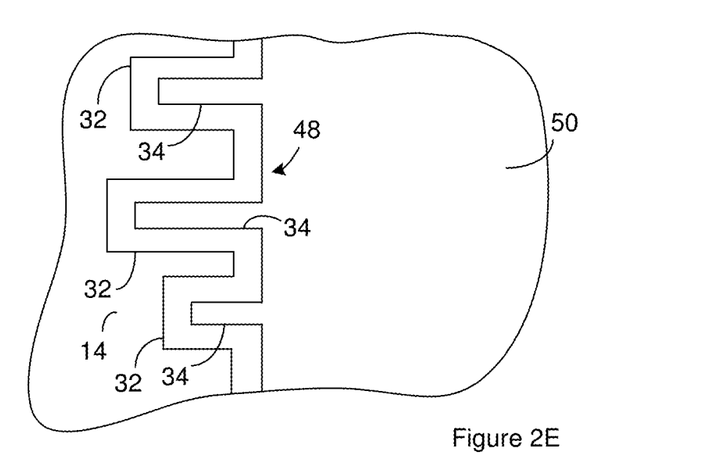
FIG. 2E illustrates the sheet of material of FIG. 2C after formation of an anode metal oxide on the exposed surfaces of an anode metal.

The anode metal oxide 12 is formed on the anode metal 14 that is exposed in the sheet of material 48. For instance, the anode metal oxide 12 can be formed on the anode metal 14 that is exposed in FIG. 2D so as to provide a sheet of material 48 according to FIG. 2E. The anode metal oxide 12 extends into the channels 32 so as to provide anode oxide channels 34. Forming the anode metal oxide 12 on the exposed anode metal 14 can include converting a portion of the existing anode metal 14 to the anode metal oxide 12 or adding a layer of the anode metal 14 over the previously existing anode metal 14. Converting a portion of the existing anode metal 14 to the anode metal oxide 12 can include reacting the anode metal 14 with a component such as oxygen. The anode metal oxide 12 is formed so the anode metal oxide 12 is in a first phase of the anode metal oxide 12. As an example, when the anode metal 14 is aluminum, the boehmite phase (AlO(OH)) of aluminum oxide is formed as the anode metal oxide 12. The first phase of the anode metal oxide 12 is desirable for the final capacitor. For instance, the first phase of the anode metal oxide 12 generally serves as the dielectric for the capacitor.

An example of a suitable method of forming the anode metal oxide 12 on the anode metal 14 includes an optional preliminary hydration layer formation operation, one or more oxide formation operations, and one or more thermal treatments.

The preliminary hydration layer formation operation forms a preliminary hydration layer in direct contact with the anode metal 14. The preliminary hydration layer can include, consist of, or consist essentially of the anode metal 14, hydrogen, and water. For instance, the preliminary hydration layer can include, consist of, or consist essentially of a hydrate of the anode metal 14. When the anode metal 14 is aluminum, the preliminary hydration layer can include, consist of, or consist essentially of aluminum hydrate.

In some instances, the preliminary hydration layer is formed on the anode metal 14 by placing the sheet of material 48 in a bath liquid that includes, consists of, or consists essentially of water. In one example, the bath liquid is de-ionized water. The bath liquid may be held at a temperature between 60° C. and 100° C. In some instances, the bath liquid is maintained at about 95° C. The sheet of material 48 can remain in the bath liquid for a formation time. The formation time can be greater than 1 minute and/or less than 20 minutes. The hydration can help form a better quality oxide during the one or more oxide formation operations.

An example of a suitable oxide formation operation includes, but is not limited to, mechanisms that convert existing anode metal 14 to anode metal oxide 12 such as anodic oxidation. In anodic oxidation, the sheet of material 48 is placed in an electrolytic bath while a positive voltage is applied to the sheet of material 48. The thickness of the layer of anode metal oxide 12 can be increased by increasing the applied voltage. When the anode metal 14 is aluminum, anodic oxidation forms a layer of the boehmite phase of aluminum oxide (AlO(OH)) on a layer of aluminum. In one example of anodic oxidation, the anode metal oxide 12 is formed by placing the sheet of material in citric acid while a positive voltage of 400-550 volts is applied to the sheet of material for a period of time between 30 minutes to 150 minutes. Additionally or alternatively, the electrical current that results from the applied voltage can be monitored and the sheet of material can be removed from the electrolytic solution in response to the electrical current exceeding a treatment threshold.

The layer of oxide formed during the first oxide formation operation performed on the sheet of material replaces and/or consumes the preliminary hydration layer formed during the preliminary hydration layer formation operation. As a result, the preliminary hydration layer is generally not present on the layer of material after the first oxide formation operation.

In some instances, the thermal treatments are each performed after an oxide formation operation. The thermal treatments elevate the temperature of the sheet of material enough to drive out water from the layer of anode metal oxide 12 formed during the previous oxide formation operation(s). The removal of this water has been shown to decrease the leakage of capacitors. However, it is not desirable to remove all of the water from the layer of anode metal oxide 12. Additionally, applying high levels of thermal energy to the sheet of material can increase the level of deformation in a capacitor that includes an electrode made from the sheet of material. As a result, reducing the amount of thermal energy applied to the sheet of material while removing water may lead to both decreased leakage and decreased deformation.

An example of a suitable thermal treatment can include placing the sheet of material in an oven at a thermal treatment temperature for a thermal treatment time. Suitable thermal treatment temperatures include, temperatures greater than 100° C., or 300° C. and/or less than 600° C., or 800° C. Suitable thermal treatment times include, times greater than 10 second, or 30 seconds, 3 minutes and/or less than 5 minutes, or 20 minutes. In some instances, all or a portion of the thermal treatments are performed while compressing the sheet of material. Compressing the sheet of material during the thermal treatments can reduce warping of the sheet of material.

When the method of forming the anode metal oxide 12 on the anode metal 14 includes a preliminary hydration layer formation operation, the preliminary hydration layer formation operation can be performed before the one or more oxide formation operations and before the one or more thermal treatments. When the method of forming the anode metal oxide 12 includes multiple oxide formation operations, the one or more thermal treatment can be alternated with the oxide formation operations. When the method of forming the anode metal oxide 12 on the anode metal 14 includes a preliminary hydration layer formation operation, the first oxide formation operation can be performed between the preliminary hydration layer formation operation and the first thermal treatment. Additionally or alternatively, the last oxide formation operation can be performed after the last thermal treatment or the thermal treatment can be performed after the last oxide formation operation. In one example of the method of forming the anode metal oxide 12, the first oxide formation operation is performed between a preliminary hydration layer formation operation and the first thermal treatment; the one or more thermal treatment are alternated with the one or more oxide formation operations; and the last oxide formation operation is performed after the last thermal treatment. In another example of the method of forming the anode metal oxide 12, the first oxide formation operation is performed between a preliminary hydration layer formation operation and the first thermal treatment; the one or more thermal treatment are alternated with the one or more oxide formation operations; and the last thermal treatment operation is performed after the last oxide formation.

FIG. 2A through FIG. 2G illustrate a method of using fabrication to acquire a sheet of material 48 having a first phase of an anode metal oxide 12 on an anode metal 14. Alternately, any stage of the sheet of material 48 shown in FIG. 2A through FIG. 2G can be acquired by purchase from a supplier.

Figure 2F:
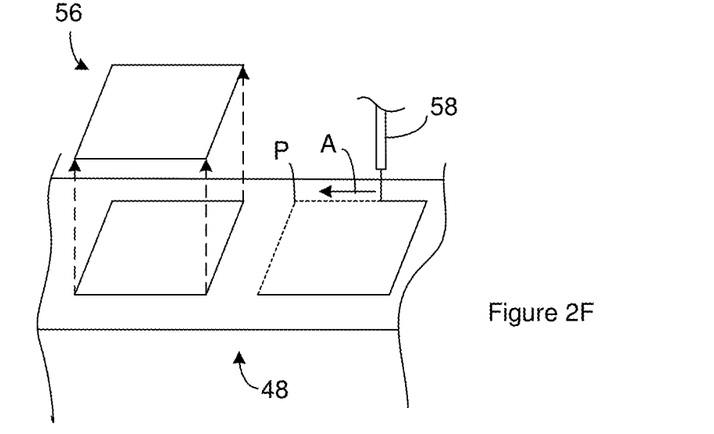
FIG. 2F illustrate an anode extracted from the sheet of material shown in FIG. 2F.

One or more anode precursors 56 are extracted from the sheet of material 48. Accordingly, a portion of the sheet of material 48 serves as the anode precursor 56. Suitable methods of removing an anode precursor 56 from the sheet of material 48 include, but are not limited to cutting the anode precursor 56 out of the sheet of material 48. A suitable method of cutting the anode precursor 56 out of the sheet of material 48 include mechanical cutting method such as die cutting where the anode precursor is punched or stamped from a sheet of material using a mechanical die. Another suitable method of cutting the anode precursor 56 out of the sheet of material 48 includes no-contact cutting methods such as laser cutting of the anode precursor 56. FIG. 2F illustrates use of a laser 58 to cut anode precursors 56 out of a sheet of material 48 constructed according to FIG. 2F.

Laser cutting may provide an increase in yield and efficiency when compared with mechanical cutting methods. Laser cutting of the sheet of material can cause melted portions of the sheet of material to solidify and stay on the resulting anode precursor. Alternately, portions of the sheet can vaporize and then re-deposit on the resulting anode precursor during the laser cutting process. As a result, a laser cut anode precursor can include these excess materials near or at the edge of the anode precursor.

These re-solidified materials and/or the re-deposited materials can be reduced by using a pulsed laser beam to cut the anode precursor from the sheet of material. The short pulse durations are possible with pulsed lasers that can provide very high peak powers for moderately energetic pulses. The increased peak power can provide vaporization of the sheet of material during the laser cutting process. This vaporization can eject the material from any recess or trench created in the sheet of material through the top of the sheet of material. Since the material is ejected from the sheet of material, the amount of material that re-solidifies and/or re-deposits on the sheet of material is reduced.

In some instances, the duration of the pulse is greater than 0 s, or a femtosecond ($10^{-15}$ s) and/or less than a microsecond ($10^{-6}$ s). In one example, the duration of the pulse is greater than 100 femtoseconds and less than 900 femtoseconds. The time between pulses is inversely related to the pulse frequency. Suitable pulse frequencies can be greater than 0 Hz, or 100 Hz, and/or less than 2000 kHz. In one example, the pulse frequency is in a range of 200 kHz to 600 kHz. In some instances, the duration of the pulse is greater than 0 s, or a femtosecond ($10^{-15}$ s) and/or less than a microsecond ($10^{-6}$ s) and the pulse frequency is greater than 0 Hz, or 100 Hz, or 100 kHz and/or less than 2000 kHz.

The power density of the laser beam at the sheet of material can be at a level that a single pulse elevates the temperature of the sheet of material above the boiling point of the anode metal and vaporizes the anode metal. In some instances, power density of the laser beam is such that at least a portion of the sheet of material that is illuminated by the laser reaches the boiling point of the anode metal and vaporizes in a period of time less than or equal to the duration of one pulse when the illuminated portion of the sheet of material is at temperature (23° C. or 25° C.) before the pulse. In an example where the anode metal is aluminum, the pulse duration is 820 femtoseconds, the pulse frequency is 400,000 pulses per second, and the laser beam has a power density $7.99 \times 10^{11}$ W/cm$^2$ at the surface of the sheet of material. Suitable power densities include, but are not limited to, power densities greater than 0 W/cm$^2$, $1 \times 10^{11}$ W/cm$^2$, or $2 \times 10^5$ W/cm$^2$ and/or less than $9 \times 10^{11}$ W/cm$^2$ or $2 \times 10^5$ W/cm$^{12}$. The combination of elevated power densities and reduced pulse durations reduces the amount of heat transferred to the sheet of material. However, adjusting these parameters may not be sufficient to address the increase in deformation that can result from using laser cutting of the anodes rather than stamped or punched cutting of the anodes.

The path of the laser beam across the face of the sheet of material can be controlled by electronics and/or software. The electronics and/or software can move the laser beam relative to the sheet of material and/or the sheet of material relative to the laser beam. In FIG. 2F, the solid lines and the dashed lines that show the outline of an anode precursor in the sheet of material represent the laser beam pathway during the process of cutting the anode precursor from the sheet of material. As a result, the laser is incident on the anode metal oxide during at least a portion of the laser cutting.

The inventors have found that tuning the characteristics for the laser beam path across the sheet of material can also reduce the leakage and deformation to or even below the levels associated with stamping or punching of anodes. For instance, the rate at which the beam is scanned across the sheet of material can be tuned. Faster scan rates reduce the amount of energy that is absorbed by the anode precursor. In some instances, the laser beam is scanned across the sheet of material at a rate greater than 0 mm/sec, 100 mm/sec, or 600 mm/sec, and/or less than 900 mm/sec, or 1100 mm/sec.

Reducing the spot size can also reduce the amount of thermal energy transferred to the sheet of material. Suitable spot sizes include, but are not limited to, spot having a diameter or major axis greater than 10 microns, 30 microns and/or less than 50 microns, or 150 microns. Additionally or alternately, the spot size can be selected to produce spot overlaps less than 100%. A spot is the area of the sheet of material illuminated by the laser beam during a pulse. Spot overlap is the overlap of a spot with the spot provided by the previous pulse. Suitable spot overlaps include spot overlaps greater than 70%, or 90% and/or less than 100%. The spot size can be selected to provide these levels of spot overlap when combined with the above scan rates and pulse frequencies.

Increasing the beam scan rate can reduce the depth that the laser beam cuts into the sheet of material. As a result, multiple passes of the laser beam along a pathway may be necessary in order to completely cut the anode precursor out of the sheet of material. This result is evident in the pathway labeled P FIG. 2F. The pathway includes dashed lines that indicate where the laser beam has cut into the sheet of material without cutting through the sheet of material. The pathway also includes solid lines that indicate the portion of the anode precursor outline where the laser beam has cut through the sheet of material. Additionally, the arrow labeled A indicates the travel direction travel for the laser beam relative to the anode precursor. At the start of the laser cutting, the laser beam may be incident on the anode metal oxide. Once the laser beam has cut through the anode metal oxide, the laser beam is incident on the anode metal.

The need for multiple passes of the laser beam in order to cut through the sheet of material means that each location along the beam pathway is not exposed to the laser beam energy for a pass interval. The pass interval can be the time between passes of the laser beam and/or can be the period of time that passes between each point along the pathway being exposed to the laser beam. Suitable pass intervals include, but are not limited to, pass intervals more than 0.1 seconds per pass and/or less than 3 seconds per pass. In some instances, the pass interval is selected such that more than 5, or 10 and/or less than 100 passes of the laser beam around the entire outline of the anode precursor are required to completely extract an anode precursor from the sheet of material.

The laser pathway can includes multiple different tracks. FIG. 2H is a topview of a portion of a sheet of material 48. A portion of a laser pathway on the sheet of material is labeled P. The laser pathway includes a first track 59 represented by dashed lines and a second track 60 represented by solid lines. The first track 59 represents the track that the laser follows during a pass along the laser pathway. The second track 60 represents the track that the laser follows during a different pass along the laser pathway. The first track 59 has a width labeled w and the second track 60 has a width labeled W. When the first track 59 and the second track 60 are followed by the same laser or by lasers with the same spot size, the width of the first track 59 will be the same or about the same as the width of the second track 60.

The second track 60 is offset from the first track 59 by a distance labeled OS in FIG. 2H. The amount of offset can be selected such that the second track 60 partially overlaps the first track 59 as shown in FIG. 2H. The use of partially overlapping tracks while laser cutting the anode precursor widens the trench that the laser forms in the sheet of material to a width larger than the spot diameter. The cutting of a wider trench can reduce the amount of thermal energy that is applied to previously formed surfaces in the trench. The track overlap percentage can be the overlap distance divided by the width of the overlapped track. Suitable track overlap percentages include, but are not limited to, track overlap percentages greater than 25% or 30% and/or less than 50% or 75%. The offset distance can be a function of spot size. For instance, when the spot size has a diameter of 40 microns, a suitable offset distances can be any distance between 0 and 40 microns such as 10 to 30 microns.

In some instances, the different tracks extend around the perimeter of the anode and/or surround the perimeter of the anode. For instance, the entire length of the laser pathway shown FIG. 2F can include two tracks that partially overlap as shown in FIG. 2H. In other words, the laser pathway of FIG. 2H can represent the laser pathway of any straight portion of the laser pathway shown FIG. 2F. Accordingly, the laser can trace all, or substantially all, of the anode perimeter along one track and later trace all, or substantially all, of the anode perimeter along another track that partially overlaps the prior track as described above. Alternately, different tracks can partially overlap along one or more portions of the anode perimeter but completely overlap along one or more other portions of the anode perimeter.

Although the laser pathway in FIG. 2H is illustrated as having two tracks, the laser pathway can include a single track or more than two tracks. During the laser cutting process, a track can be followed once or more than once. For instance, when a laser pathway includes two tracks as is shown in FIG. 2H, the laser can alternate between different tracks on subsequent passes. As an example, the laser can follow the first track 59, the second track 60, the first track 59, the second track 60, and so on until the trench extends through the sheet of material and the anode precursor is extracted from the sheet of material.

In some instances, the anode precursor is fabricated using one, two, three, four, five or six parameters selected from the group consisting of a laser pulse duration, pulse frequency, power density, scan rate, pass interval, and pass number. In these instances, the laser pulse duration is 400 femtoseconds, the laser pulse frequency is 400 kHz, the power density is $7.99 \times 10^{11}$ W/cm$^2$, the scan rate is 720 mm/sec, the pass interval is 0.25 s, and the pass number is 60.

While adjusting the laser parameters reduces the amount of material that re-solidifies and/or re-deposits on the sheet of material, some of this material still re-solidifies and/or re-deposits on the sheet of material. The re-solidified and/or re-deposited material includes of consists of a second phase of the anode metal oxide. For instance, when laser cutting is used to cut an anode precursor from a sheet of material where aluminum serves as the anode metal 14, a material that re-solidifies and/or re-deposits on the anode precursor includes or consists of the alpha-corundum oxide ($\alpha$-Al$_2$O$_3$) phase of aluminum oxide.

The second phase of the anode metal oxide 12 is often undesirable. For instance, the second phase of the anode metal oxide 12 can be more electrically conductive than the first phase of the anode metal oxide 12. As an example, the alpha corundum oxide ($\alpha$-Al$_2$O$_3$) phase of aluminum oxide has properties of a semiconductor. As a result, the alpha phase corundum oxide ($\alpha$-Al$_2$O$_3$) is not suitable for use as a dielectric and is accordingly associated with undesirably high levels of leakage and deformation. However, alpha phase corundum oxide ($\alpha$-Al$_2$O$_3$) is very stable and is difficult to convert back into the boehmite phase of aluminum oxide. While adjustments to the laser cutting parameters disclosed above can partially address the leakage and deformation associated with the presence of the second phase of the anode metal oxide, a recovery process can be performed so as to remove at least a portion of any second phase of the anode metal that is present on the anode precursor.

A hydration layer formation operation can be performed before the recovery process. The hydration layer formation operation includes generating a hydration layer on one or more regions of the anode metal 14 that are exposed. The exposed regions of the anode metal 14 can at the edges of the anode precursor 56 as a result of the process of extracting the anode precursor 56 from the sheet of material 48. The hydration layer on the one or more exposed regions of the anode metal includes, consists of, or consists essentially of the hydrate of the anode metal. For instance, when the anode metal is aluminum, the hydration layer includes, consists of, or consists essentially of aluminum hydrate (Al(OH)$_3$ or Al$_2$O$_3$.3H$_2$O).

The hydration layer can be formed by exposing the anode precursor to steam. The steam can be saturated or superheated. The exposure of the anode precursor to the steam forms the hydrate of the anode metal on the one or more exposed regions of the anode precursor. The hydration layer can undercut portions the second phase of the anode metal oxide such that portions of the hydration layer are located between the anode metal and the second phase of the anode metal oxide. When the second phase of the anode metal oxide is alpha phase corundum oxide ($\alpha$-Al$_2$O$_3$) and the hydration layer includes or consists of aluminum hydrate, the aluminum hydrate can undercut portions of the corundum oxide such that portions of the hydration layer are located between the anode metal and the second phase of the anode metal oxide.

Figure 2G:
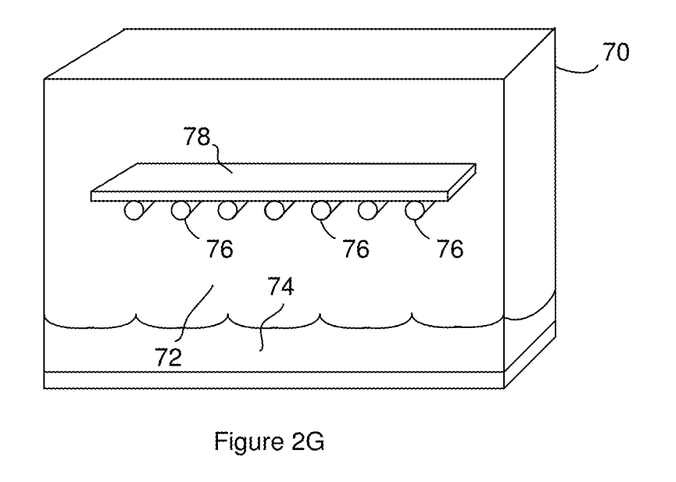
FIG. 2G is a schematic of an anode precursor being exposed to steam.
Figure 2H:
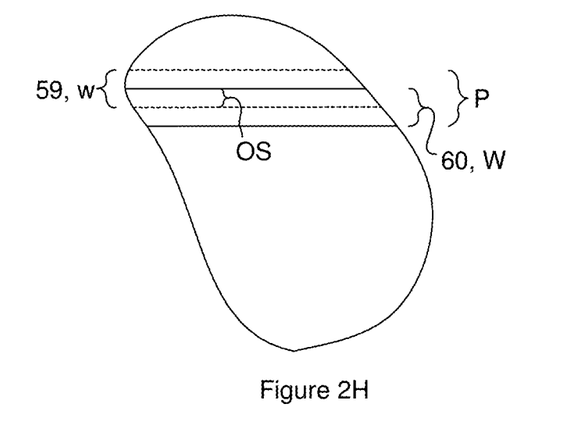
FIG. 2H is a topview of a portion of a sheet of material having a laser pathway with multiple different tracks.

FIG. 2G illustrates a system that is suitable for exposing the anode precursor to the steam. The system includes a container 70 positioned in an atmosphere. The container 70 has an interior. The container can be sealed such that the interior of the container can be maintained at a pressure and/or temperature that is different from the atmosphere. The interior of the container holds a gas 72 in contact with a liquid 74. The liquid 74 includes, consists of, or consists essentially of water. The interior of the container 70 can include one or more supports 76 on which the anode precursor 78 can be positioned. The one or more supports hold the anode precursor such that the edges of the anode precursor contact the gas. In some instances, the one or more supports hold the anode precursor such that the anode precursor is surrounded or substantially surrounded by the gas 72. The gas 72 includes water vapor in a carrier gas. The water vapor serves as the steam to which the anode precursor is exposed. The carrier gas can be the same as the atmosphere in which the container 70 is positioned. For instance, the container 70 can be positioned in air from the ambient atmosphere and the steam to which the anode precursor is exposed can be in the air from the ambient atmosphere in which the container 70 is positioned.

In some instances, the container 70 includes a lid (not shown) that can be opened and closed to permit the anode precursor to be positioned in the interior of the container 70 and removed from the interior of the container 70. The system includes a heater configured to heat the water and can elevate the temperature of the water and gas 72 above the temperature of the atmosphere in which the container 70 is positioned. The gas 72 can be in equilibrium with the liquid 74. As a result, the steam can be saturated or substantially saturated. In some instances, the steam is saturated for the entire duration of the exposure of the anode precursor to the steam. In some instances, there is a delay between placement of the anode precursor in the container 70 and the gas 72 coming into equilibrium with the liquid 74. As a result, the steam can be unsaturated for a portion of the entire duration of the exposure of the anode precursor to the steam. In instances where the gas 72 does not come into equilibrium with the liquid 74 during the exposure of the anode precursor to the steam, the steam can be unsaturated for the duration of the exposure of the anode precursor to the steam. Although not illustrated in FIG. 2G, the steam can be supersaturated.

Increasing the temperature of the steam can increase the rate at which the hydration layer is formed. As a result, increasing the temperature of the steam can decrease the time for which the anode precursor needs to be exposed to the steam. In some instances, increasing the temperature of the steam by 10° C. reduces the time for which the anode precursor needs to be exposed to the steam by about one half. Suitable times for exposure of the anode precursor to the steam include, but are not limited to, times greater than or equal to 5 second, or 15 seconds and/or less than one minute, two minutes, or three minutes. When the anode metal is aluminum, the time of exposure can be at least 5 second, or 15 seconds. Suitable temperatures for the steam include, but are not limited to, temperatures greater than or equal to 140° C. or 150° C. and/or less than 220° C. or 250° C. Suitable pressures for the steam include, but are not limited to, pressures greater than or equal to 52 psi, or 69 psi and/or less than or equal to 336 psi or 576 psi.

A passivation layer can optionally be formed on the exposed anode metal that is not covered by the anode metal oxide and/or the hydration layer. A suitable method for forming the passivation layer includes, but is not limited to, immersing at least a portion of the anode precursor 56 in a passivation bath that includes, consists of, or consists essentially of ammonium dihydrogen phosphate. In some instances, the passivation bath is maintained at a temperature greater than 52° C. and/or less than 90° C., or 70° C. Additionally or alternately, the passivation bath can contain more than 0.1 wt %, or 5.0 wt %, and/or less than 2.0 wt % ammonium dihydrogen phosphate. The anode precursor 56 can be at least partially immersed in the passivation bath for a time greater than one minute and/or less than four minutes. After removing the anode precursor 56 from the passivation bath, the anode precursor 56 can be rinsed under de-ionized water for a time greater than one minute and/or less than 12 minutes.

Although the formation of the passivation layer is disclosed as occurring after the formation of the hydration layer, the passivation layer can be generated before the creation of the hydration layer. For instance, the passivation layer can be formed after forming the anode metal oxide 12 on the anode metal 14 and before creating the hydration layer. As a result, the passivation layer can be formed on the sheet of material before the anode precursor is extracted from the sheet of material.

Figure 2I:
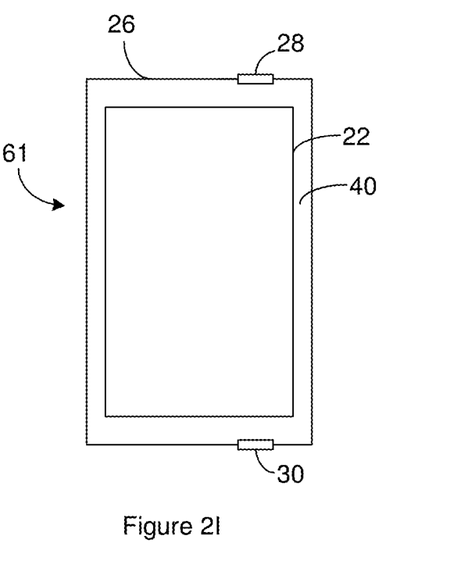
FIG. 2I illustrates a capacitor that includes the anode of FIG. 2F.

The one or more anode precursors 56 constructed according to FIG. 2A through FIG. 2G are included in a capacitor precursor 61 according to FIG. 2I. For instance, one or more of the anode precursors 56 are combined with one or more separators 24 and one or more cathodes 16 so as to form an electrode assembly 22 with the components arranged as disclosed in the context of FIG. 1A through FIG. 1E. The electrode assembly 22 is placed in a capacitor case 26 along with the electrolyte 40. Any electrical connections needed for operation of the capacitor precursor 61 are made and the capacitor case 26 is sealed.

The capacitor precursor 61 can be put through a recovery process. The recovery process can be configured to form a recovery anode metal oxide on all or a portion of the anode metal that is exposed to the hydration layer. For instance, the recovery process can form the recovery anode metal oxide on the anode metal that contacts the hydration layer. At least a portion of the recovery anode metal oxide can be in contact with the anode metal. Since a portion of the hydration layer can be located between the anode metal and the second phase of the anode metal oxide, a portion of the recovery anode metal oxide can be between the anode metal and the second phase of the anode metal oxide. The formation of the recovery anode metal oxide in this located during the recovery process can effectively pry the second phase of the anode metal oxide away from the anode metal. The prying can be sufficient to break the contact between anode metal and the second phase of the anode metal oxide such that at least portion of the second phase of the anode metal oxide is removed from the anode precursor. As a result, the recovery process replaces at least portion of the second phase of the anode metal oxide with the recovery anode metal oxide.

The recovery process can convert the hydration layer to the recovery anode metal oxide. In some instances, the anode metal reacts with water in the electrolyte to form the recovery anode metal oxide. For instance, when the hydration layer is consumed before completion of the recovery process, the anode metal under the recovery anode metal oxide can react with the water in the electrolyte to form the recovery anode metal oxide. As an example, the anode metal can react with the water in the electrolyte to form the recovery anode metal oxide when the hydration layer is consumed before completion of the recovery process, a voltage is applied to the capacitor during the recovery process, and the applied voltage exceeds the voltage level needed to convert all of the hydration layer to the recovery anode metal oxide. The electrolyte can have a water content below 3.0% by weight. In one example, the water content is between 0.5 wt % and 3.0 wt % in the electrolyte. Additionally, the formation of the recovery anode metal oxide consumes the anode metal oxide and the hydration layer. In some instances, the hydration layer is entirely consumed and is not present on the anode precursor after the recovery process.

The phase of the recovery anode metal oxide is not necessarily the same as the first phase of the anode metal oxide and/or the second phase of the anode metal oxide. For instance, the phase of the recovery anode metal oxide can include the first phase of the anode metal oxide or be different from the first phase of the anode metal oxide and the second phase of the anode metal oxide. When the anode metal is aluminum, the recovery anode metal oxide is not the boehmite phase but is similar to the boehmite phase. For instance, when the anode metal is aluminum, the recovery anode metal oxide can include or consist of a pseudo-boehmite phase. The pseudo-boehmite phase includes the boehmite phase of the anode metal oxide but with a higher water content than is present in the boehmite phase. The recovery anode metal oxide is preferable to the second phase of the anode metal oxide. For instance, the recovery anode metal oxide can have more favorable electrical properties than the second phase. For instance, the recovery anode metal oxide can have a higher dielectric constant than the second phase.

The recovery process can include one or more active phases where a constant voltage is applied to the capacitor so as to charge the capacitor. When the recovery process includes more than one active phase, the temperature of all or a portion of the active phases can be the same or different and/or the applied voltage can be the same or different. The recovery phase can include one or more than one passive phase where the capacitor precursor is held at an elevated temperature and is discharged and/or is at zero applied voltage. When the recovery process includes more than one passive phase, the temperature of all or a portion of the passive phases can be the same or different.

In some instances, passive phases and active phases are alternated. For instance, the recovery process can include one or more passive phases that are performed between active phases. In instances where one or more passive phases are performed between active phases, one or more active phases can be performed between each pair of passive phases that are adjacent to one another in time. The number of active phase performed between each adjacent passive phase pair in the recovery process can be the same or different. Examples of different active phases are active phases where a capacitor precursor is held at different temperatures and/or at different applied voltage levels.

The recovery process can start with one of the active phases and end with one of the passive phases. In some instance, the temperature of all or a portion of the passive phases is the same as the temperature used in the immediately preceding active phase. During the recovery process, additional electrolyte can be added to the capacitor precursor at one or more times at one or more stages selected from the group consisting of between active phases, between adjacent active and passive phases, and after the recovery process. In some instances, the recovery process can also serve as an aging process that is performed during capacitor fabrication.

Suitable temperatures for the one or more active phases and/or the one or more passive phases include, but are not limited to temperatures greater than 50° C. or 70° C. and/or less than 100° C. or 200° C. The voltage applied during the one or more active phases can be chosen relative to the voltage applied to the sheet of material during the oxide formation operation. For instance, the voltage applied during all or a portion of the one or more active phases can be less than the voltage applied to the sheet of material during the oxide formation operation. Increasing the voltage can increase the thickness of the recovery anode metal oxide. In some instances, the voltage applied during all or a portion of the one or more active phases is greater than 50% and less than 95% of the voltage applied to the sheet of material during the oxide formation operation. Examples of voltages for the one or more active phases include, but are not limited to voltages greater than a voltage greater than 50 V, or 200 V and/or less than 600 V or 800 V.

The duration of all or a portion of the one or more active phases can be greater than or equal to the time to charge the capacitor precursor to the desired level. There is not necessarily a real upper limit to the duration of the one or more active phases but there can be practical upper limit determined by the desired duration for the recovery process. Examples of suitable times for each of the one or more active phases include, but are not limited to, times greater than or equal to 0.1 seconds, 1 minute and/or less than 24 hours. The duration of all or a portion of the one or more passive phases can be greater than or equal to the time to discharge the capacitor precursor to the desired level. There is not necessarily a real upper limit to the duration of the one or more passive phases but there can be a practical upper limit determined by the desired duration for the recovery process. Examples of suitable times for each of the one or more passive phases include, but are not limited to, times greater than or equal to 0.1 seconds, 1 minute and/or less than 24 hours. There is not necessarily a real upper limit to the total duration of the recovery process but there can be a practical upper limit determined by the total time that is practically available to fabricate a capacitor. Examples of total times for the recovery process include, but are not limited to, total times greater than 2 hours, or 20 hours, and/or less than 50 hours or one hundred hours.

The capacitor precursor 61 can optionally be put through a testing phase. The testing phase can be configured to test the capacitor precursor 61 for charge and discharge functionality.

In some instances, an oxide phase extraction is performed on the capacitor precursor 61. The oxide phase extraction can be performed before the recovery process, after the recovery process, between the recovery process and the testing phase, or after the testing phase. The oxide phase extraction can include an oxide removal stage that removes all or a portion of the second phase of the anode metal oxide from the anode precursor 56 and/or from the portion of the sheet of material 48 that serves as the anode precursor 56. In some instances, the oxide phase extraction moves all or a portion of the second phase of the anode metal oxide 12 from the anode precursor 56 into the electrolyte 40. The oxide phase extraction can be performed such that the first phase of the anode metal oxide 12 remains intact or remains substantially intact. The oxide phase extraction can also include an oxide restoration stage that forms the anode metal oxide 12 on exposed anode metal 14 and/or on areas where the anode metal oxide 12 is thin. As a result, the oxide restoration stage can restore the first phase of the anode metal oxide that is removed or damaged during the oxide removal stage. The phase of the anode metal oxide 12 formed during the oxide restoration stage can be the first phase of the anode metal oxide 12. Suitable methods for the oxide restoration stage can be the same or similar to the methods used in the aging phase.

An example oxide phase extraction includes one or more cycles. Each cycle can include the oxide removal stage followed by the oxide restoration phase. When the oxide phase extraction includes multiple cycles, the cycles can be repeated in series. An example oxide phase extraction includes a high temperature stage that acts as an oxide removal stage followed by a low temperature stage and a charging stage. The low temperature stage can be performed between the high temperature stage and the charging stage. The high temperature stage can be configured to move all or a portion of the second phase of the anode metal oxide 12 from the anode precursor 56 and into the electrolyte 40. The low temperature stage can be configured to form the first phase of the anode metal oxide 12 on any anode metal 14 that becomes exposed during the high temperature stage. The charging stage causes a current surge through the anode precursor 56 that reforms the anode metal oxide 12. For instance, the charging stage can form the first phase of the anode metal oxide 12 on the anode precursor 56 from oxygen in the electrolyte 40. Accordingly, the low temperature stage and the charging stage together can serve as an oxide restoration stage.

An example of a single cycle of the oxide phase extraction includes a high temperature stage where the capacitor precursor 61 is exposed to a temperature $T_1$ for a time period $P_1$; a low temperature stage where the capacitor precursor 61 is exposed to a temperature $T_2$ for a time period $P_2$; and a charging stage where the capacitor precursor 61 is charged to $V_1$ and discharged. The cycle of the oxide phase extraction can be performed N times.

Examples of suitable $T_1$ include, but are not limited to, $T_1$ greater than 45° C., or 50° C. and/or less than 90° C. or 100° C. In some instances, prolonged exposure of the capacitor to temperatures above 90° C. can damage one or more components of the capacitor. Examples of suitable $P_1$ include, but are not limited to, $P_1$ greater than 0.5 hours and/or less than 2 days. The variables $T_1$ and $P_1$ can be a function of materials and/or configuration. Additionally, the value of $P_1$ can be a function of $T_1$. Exposure of a capacitor precursor 61 to increased temperatures for prolonged periods of time can damage the capacitor precursor 61 components. As a result, as $T_1$ increases, it is generally desirable to reduce the value of $P_1$. For example, when $T_1$ is above 85° C., $P_1$ can be less than 2 hours but when $T_1$ is below 50° C., $P_1$ can be more than 1 day.

Examples of suitable $T_2$ include, but are not limited to, $T_2$ greater than 35° C., or 45° C. and/or less than 50° C. or 70° C. Examples of suitable $P_2$ include, but are not limited to, $P_2$ greater than 10 minutes and/or less than 100 minutes or one day. In some instances, $T_1$ is higher than $T_2$ but $P_1$ is longer than $P_2$. Examples of suitable $V_1$ include, but are not limited to, $V_1$ greater than 200 V, 400V and/or less than 500V or 600V. Examples of suitable N include, but are not limited to, N greater than 0, 1, or 8 and/or less than 15, 25, or 35.

An example of the oxide phase extraction includes any one, any two, any three, any four, any five, or any six features selected from the group consisting of $T_1$ greater than 45° C., or 50° C. and/or less than 90° C. or 100° C., $P_1$ greater than 0.5 hours and/or less than 2 days, $T_2$ greater than 35° C., or 45° C. and/or less than 50° C. or 70° C., $P_2$ greater than 10 minutes and/or less than 100 minutes or one day, $V_1$ greater than 200 V, 400V and/or less than 500V or 600V. In some instances, this oxide phase extraction is performed for a number of cycles, N, greater than 0, 1, or 8 and/or less than 15, 25, or 35.

When the anode metal 14 is aluminum and the first phase of the anode metal oxide 12 is the boehmite phase of aluminum oxide, an example of a cycle the oxide phase extraction includes a high temperature stage where the capacitor precursor 61 is placed in a 90° C. (+/−5° C.) oven for 1 hour (+/−5 min); a low temperature stage where the capacitor precursor 61 is placed in a 37° C. (+/−5° C.) oven for 30 minutes (+/−5 min); a charging stage where the capacitor precursor 61 is charged to 422.5 Volts and discharged. To execute the oxide phase extraction, this cycle of the oxide phase extraction can be performed once or sequentially repeated for 1 or more cycles to 35 or fewer cycles. The total number of cycles performed can be a function of the capacitor response to the preceding cycles. For instance, performance of additional cycles can be optional or skipped once the time needed to charge the capacitor after a cycle is less than a threshold. In one example, the threshold is 5% of the time needed to charge the capacitor before the cycle.

The exact number of cycles needed can be a function of the properties of the sheet of material 48 and the thermal effect of laser cutting on the edge. As a result, the number of cycles that are performed can be variable. For example, the time needed to charge the capacitor precursor 61 can be measured after each cycle. The measured charge time can be compared to a charge time threshold. If the charge time for cycle j exceeds the threshold, then an additional cycle can be performed. When the charge time for cycle j falls below the threshold, additional cycles are not performed. For instance, the threshold can be a percentage of the time needed to charge the capacitor after the immediately preceding cycle. In one example, the threshold is 5% of the time needed to charge the capacitor before the cycle.

Completion of the oxide extraction phase provides the anode and capacitor of FIG. 1A through FIG. 1G. Accordingly, the capacitor is ready for use in the desired application and/or for resale. The capacitor includes one or more anodes fabricated from the anode precursors described above. For instance, all or a portion of the anode percursors described above are converted into and/or become the anodes included in the capacitor as a result of all or a portion of the operations described above.

Example 1

Anode precursors were fabricated as described in the context of FIG. 2A through FIG. 2F using an aluminum foil as the anode metal. A hydration layer was formed on a first group of the anode precursors by exposing the first anode precursors to saturated steam at about 160° C. for two minutes. A hydration layer was formed on a second group of the anode precursors by placing the second anode precursors in a water bath at 95° C. The time needed to form the hydration layer in the first anode precursors was less than or equal to 12.5% of the time needed to form the hydration layer in the first anode precursors.

Example 2

Figure 3A:
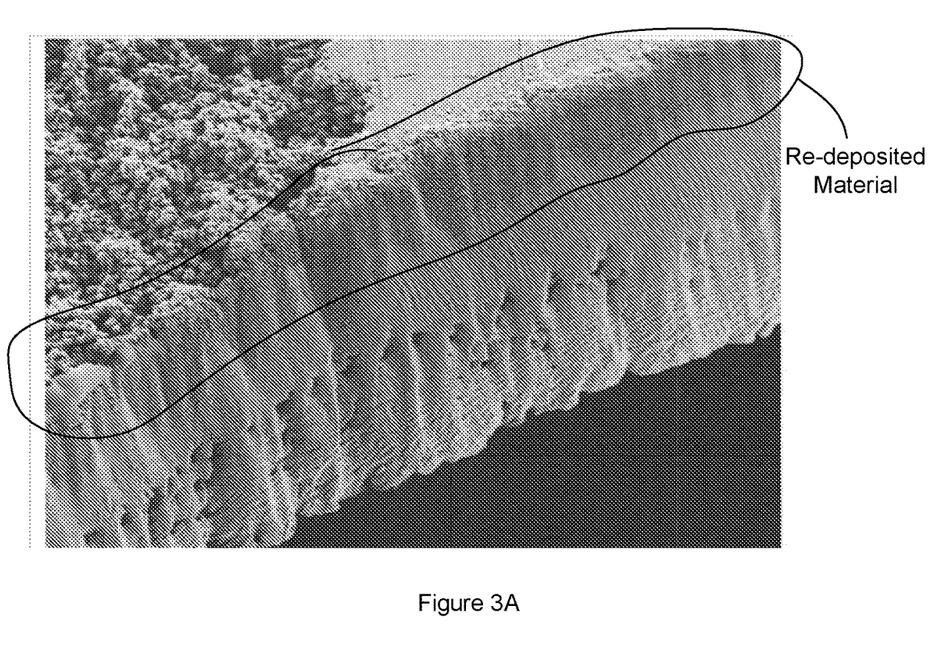
FIG. 3A is a Scanning Electron Microscope image of an anode precursor with re-solidified material present at the edge of the anode precursor.
Figure 3B:
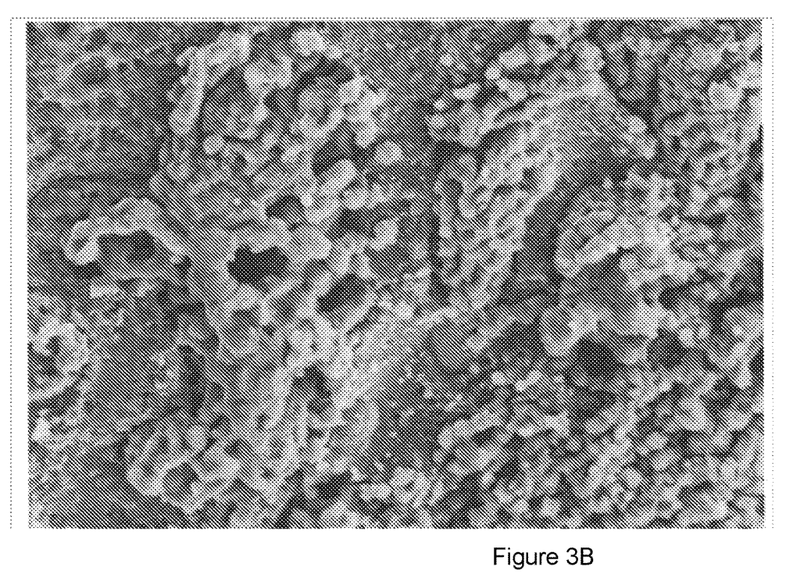
FIG. 3B is a Scanning Electron Microscope that is a close-up of the re-solidified material shown in FIG. 3A.

Anode precursors were fabricated as described in the context of FIG. 2A through FIG. 2E using an aluminum foil as the anode metal. Anode precursors were extracted from the sheet of material using a laser having a pulse duration of 600 femtoseconds, a pulse frequency of 1 MHz, and a power density on the face of the sheet of material of $1.9E12 \text{ W/cm}^2$. The laser beam was traced on the face of the sheet of material along a pathway having the shape desired for the perimeter of the anode precursor. Eight passes were required in order to completely separate the anode precursor from the sheet of material. The beam speed at the face of the sheet of material was 0.9 m/s for half the passes and 1.4 m/s for half the passes. FIG. 3A is a Scanning Electron Microscope image of an edge of one of the anode precursors. This image shows the presence of re-deposited material on the edge of the anode precursor. FIG. 3B is a close-up of the re-deposited material shown in FIG. 3A.

Figure 3C:
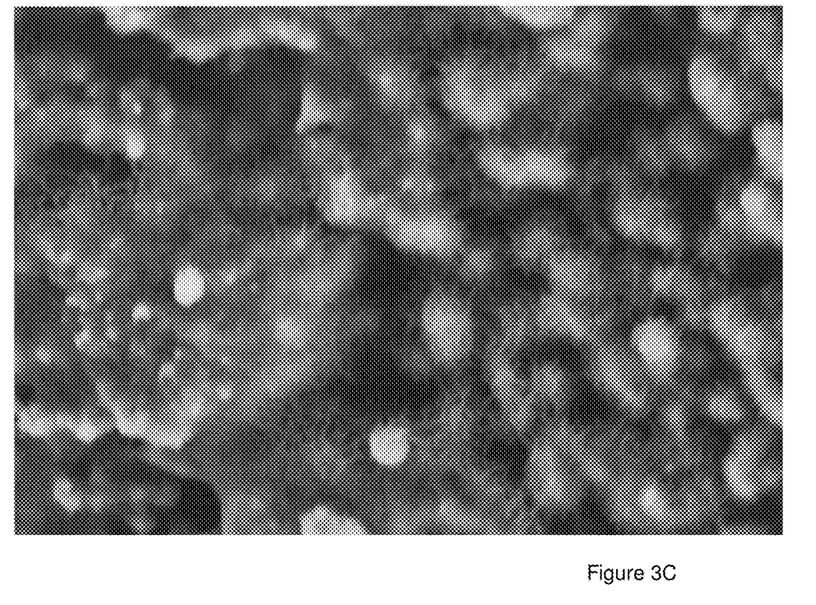
FIG. 3C is a Scanning Electron Microscope of the anode precursor of FIG. 3B after exposure of the anode precursor to steam.

The anode precursors were exposed to saturated steam at about 160° C. for two minutes. FIG. 3C is a Scanning Electron Microscope image of an edge of one of the anode precursors. The image in FIG. 3C is at twice the magnification of the image in FIG. 3B. The spider webs evident in FIG. 3C show the presence of the hydration layer on the anode precursor.

Example 3

Anode precursors were fabricated as described in the context of FIG. 2A through FIG. 2E using an aluminum foil as the anode metal. Anode precursors were extracted from the sheet of material using a laser having a pulse duration of 600 femtoseconds, a pulse frequency of 1 MHz, and a power density on the face of the sheet of material of $1.9E12 \text{ W/cm}^2$. The laser beam was traced on the face of the sheet of material along a pathway having the shape desired for the perimeter of the anode precursor. Eight passes were required in order to completely separate the anode precursor from the sheet of material. The beam speed at the face of the sheet of material was 0.9 m/s for half the passes and 1.4 m/s for half the passes.

A first group of the anode precursors were exposed to saturated steam at about 160° C. for two minutes. A second group of the anode precursors were not exposed to the steam. A passivation layer was formed on the first anode precursors and the second anode precursors by placing the first anode precursors and the second anode precursors in a 2% ammonium dihydrogen phosphate bath maintained at a temperature of 70° C. for 2 minutes followed by a 4 minute rinse in de-ionized water.

First capacitor precursors were fabricated using the first anode precursors and second capacitor precursors were fabricated using the second anode precursors. Each capacitor precursor was assembled with 45 anodes (~115 microns thick each) stacked with 10 aluminum foil cathodes (~12 microns thick each) and an ethylene glycol based electrolyte that included boric acid. Separators of 1.06 Density Kraft Paper at ~20 microns thickness were positioned between adjacent anodes and cathodes.

A capacitor aging process was performed on the first capacitor precursors and the second anode precursors and served as the recovery process. The aging process included 14 active phases and 14 passive phases. During the active phases, the capacitors were charged by application of a constant voltage to the capacitor precursors. The voltage of the different active phases varied from 400V to 440V. The temperature of the different active phases and the different passive phases was varied from 35° C. to 85° C. During the passive phases, a voltage was not applied to the capacitor precursors and the capacitor precursors were discharged. The recovery process was performed for a total time of 18:30 hrs. Additional electrolyte was added to the capacitor precursors part way through the recovery process and after the recovery process.

The resulting first capacitors and second capacitors were tested for one-minute leakage by holding the capacitors at a voltage of 425 V and watching current drop over time. The one-minute leakage time of the first capacitors was reduced by at least 14% relative to the one-minute leakage time of the first capacitors.

The resulting capacitors were each run through a series of downs and tested for the level of deformation at each down. A down for a capacitor simulates the aging that a capacitor experiences when used in an Implantable Cardioverter Defibrillator (ICD) that is implanted in a patient for a 3 month period of time. A down can be simulated by exposing the capacitor to heat. For each of the downs, the capacitors were maintained at about 90° C. for about 50 hours (equivalent of 9 months). After every down or every other down, the capacitors were test for deformation. Deformation is a measure of the change in the amount of time required to charge the capacitor relative to a baseline time. For instance, the deformation for down i can be measured as ((down i charge time)/(baseline charge time)−1)×100% where the baseline charge time is the time needed to charge the capacitor at time i=1. The charging source used for each deformation measurement was the same.

Figure 4:
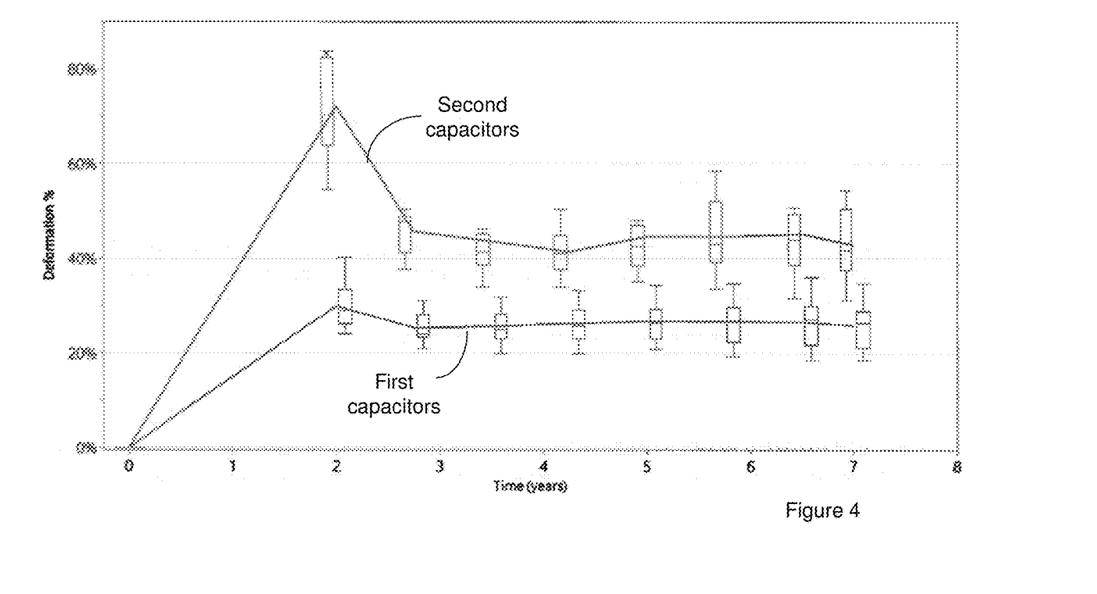
FIG. 4 is a plot of deformation versus time for different capacitors.

The deformation results are illustrated in FIG. 4. FIG. 4 is a graph showing deformation versus time. During the first down the capacitors were maintained at about 90° C. for about 133 hours (equivalent of two years) and the subsequent downs are performed as described above. The deformation at the first down is reduced by more than 50%. Additionally, the variations in deformation over time are greatly reduced. Further, the overall deformation as measured by the area under the curve is reduced by more than 35%.

Figure 5:
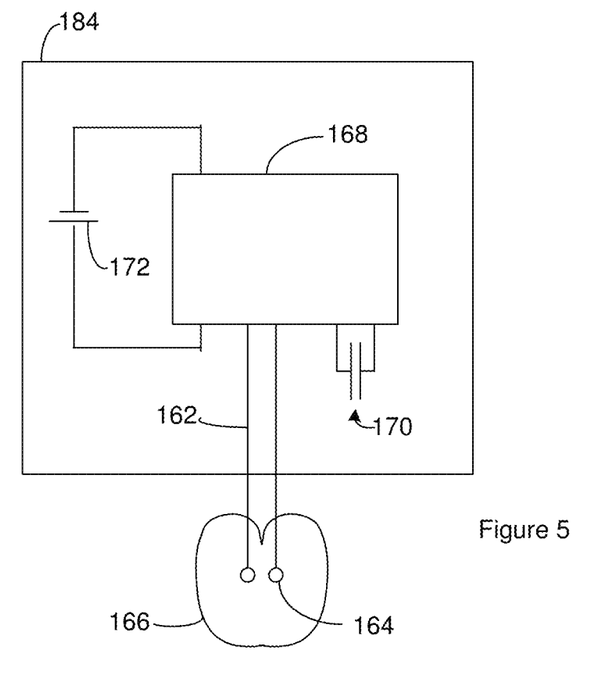
FIG. 5 is a schematic diagram of a defibrillation system that includes an Implantable Cardioverter Defibrillator (ICD) that employs one or more capacitors.

The disclosed capacitors can be used in medical devices such as an Implantable Cardioverter Defibrillator (ICD). FIG. 5 is a schematic diagram of a defibrillation system that includes an Implantable Cardioverter Defibrillator (ICD) that employs one or more capacitors constructed as disclosed above. The defibrillation system includes lead lines 162 connected to electrodes 164 in contact with the heart. Although the defibrillation system is shown with two electrodes 164, the defibrillation system may include three or more electrodes 64 and/or three or more lead lines. The specific positions of the electrodes 164 relative to the heart 166 is dependent upon the requirements of the patient.

The defibrillation system also includes a processing unit 168. The lead lines 162 provide electrical communication between the processing unit 168 and the electrodes 164. The processing unit 168 is also in electrical communication with one or more capacitors constructed as disclosed above.

The processing unit 168 receives power from a battery 172. The processing unit 168 can place the battery 172 in electrical communication with the one or more capacitors 170. For instance, the processing unit 168 can cause the battery 172 to charge the one or more capacitors 170. Additionally, the processing unit 168 can place the one or more capacitors 170 in electrical communication with the lead lines 162. For instance, the processing unit 168 can cause the one or more capacitors to be discharged such that electrical energy stored in the one or more capacitors is delivered to the heart through all or a portion of the electrodes 641. The processing unit 168, the battery 172 and the one or more capacitors 170 are positioned in a case 184.

During operation of the defibrillation system, the defibrillation system employs output from the lead lines 162 to monitor the heart and diagnose when defibrillation shocks should be provided. When the processing unit 168 identifies that defibrillation shocks are needed, the processing unit 168 provides the heart with one or more defibrillation shocks. To provide a defibrillation shock, the processing unit 168 employs energy from the battery 172 to charge the one or more capacitors 170. Once the one or more capacitors are charged, the processing unit 168 causes these capacitors to be discharged such that energy stored in the capacitors is delivered to the heart through all or a portion of the electrodes 164 in the form of defibrillation shocks. During the defibrillation shocks, the defibrillator requires that one or more pulses be delivered from the battery 172 to the one or more capacitors. Each pulse is generally associated with a defibrillation shock. The duration of each pulse is generally about 8 to 12 seconds with the pulses separated by a delay time that is based on how fast the battery charges the capacitor and determining the appropriate point to provide the defibrillation shock.

Suitable processing units 168 can include, but are not limited to, analog electrical circuits, digital electrical circuits, processors, microprocessors, digital signal processors (DSPs), computers, microcomputers, or combinations suitable for performing the monitoring and control functions. In some instances, the processing unit 168 has access to a memory that includes instructions to be executed by the processing unit 168 during performance of the control and monitoring functions.

The sequence of events disclosed above for forming an anode can be performed in a sequence other than the disclosed sequence. For instance, the oxide phase extraction can be performed on the anode before the capacitor is assembled. As another example, the recovery phase can be performed after the testing phase.

Although the above methods of forming an anode have been disclosed in the context of a capacitor, all or a portion of the steps selected from the group consisting of the laser cutting, the exposure of the electrode precursor to steam, and the recovery process can also be applied to fabrication of anodes, cathodes, positive electrodes, and/or negative electrodes in batteries.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of fabricating a capacitor, comprising:
cutting an electrode precursor from a sheet of material having a first phase of a metal oxide on a metal,
the cutting of the electrode precursor exposing an edge of the metal,
the cutting of the electrode precursor forming a second phase of the metal oxide on the metal,
the second phase of the metal oxide being different from the first phase of the metal oxide;
exposing the electrode precursor to steam so as to generate a steamed electrode precursor,
wherein
exposing the electrode precursor to steam includes creating direct contact between the edge of the metal and the steam so as to form a hydrate of the exposed metal in direct contact with the edge of the metal;
performing a recovery process on the steamed electrode precursor,
the recovery process removing at least a portion of the second phase of the metal oxide from the electrode precursor; and
fabricating the capacitor after performing the recovery process, the capacitor including an electrode fabricated from the steamed electrode precursor.

2. The method of claim 1, wherein the capacitor is an electrolytic capacitor.

3. The method of claim 1, wherein the steam is saturated.

4. The method of claim 1, wherein the steam is superheated.

5. The method of claim 1, wherein the steam is at a temperature between 150° C. and 220° C.

6. The method of claim 1, wherein the electrode precursor is exposed to the steam for less than 2 minutes, the steam is at a temperature between 150° C. and 220° C. for at least a portion of the 2 minutes, and the steam is saturated for at least a portion of the 2 minutes.

7. The method of claim 1, wherein the first phase of the metal oxide is boehmite aluminum hydroxide (AlO(OH)).

8. The method of claim 1, wherein the electrode is an anode.

9. The method of claim 1, wherein cutting the electrode precursor from the sheet of material includes laser cutting the sheet of material.

10. The method of claim 1, wherein the second phase is alpha phase corundum oxide ($\alpha$-$Al_2O_3$).

11. The method of claim 1, wherein the second phase of the metal oxide is porous.

12. The method of claim 1, wherein at least a portion of the hydrate is located between the second phase of the metal oxide and the metal.

13. The method of claim 1, wherein fabricating the capacitor includes forming an electrode assembly that includes the electrode precursor, one or more separators, and one or more cathodes; and
placing the electrode assembly in a capacitor case so as to form a capacitor precursor.

14. The method of claim 1, wherein fabricating the capacitor includes forming an assembly that includes the electrode precursor, one or more separators, and one or more cathodes;
placing the electrode assembly in a capacitor case so as to form a capacitor precursor; and
performing the recovery process on the capacitor precursor, the recovery process replacing at least a portion of the second phase of the metal oxide with a recovery metal oxide that is different from the second phase of the metal oxide.

15. The method of claim 14, wherein the recovery metal oxide includes pseudo-boehmite.

16. The method of claim 14, wherein the recovery process is performed such that the hydrate is consumed before completion of the recovery process, and
the recovery process is performed such that the metal reacts with water in an electrolyte in the capacitor case to form the recovery electrode metal oxide.

17. The method of claim 13, wherein the recovery process includes one or more passive phases where the capacitor precursor is discharged while held at a temperature greater than 50° C. and less than 200° C.

18. The method of claim 17, wherein the recovery process includes one or more active phases where the capacitor precursor is charged at a constant voltage.

19. The method of claim 18, wherein the recovery process includes passive phases alternated with active phases.

20. The method of claim 19, wherein fabricating the capacitor excludes performing an aging process on the capacitor precursor.

* * * * *